(12) United States Patent
Gatton

(10) Patent No.: US 7,198,277 B2
(45) Date of Patent: Apr. 3, 2007

(54) WHEEL CHUCK WITH COUNTERWEIGHTED JAWS

(75) Inventor: Geoffrey L. Gatton, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 29 days.

(21) Appl. No.: 10/967,729

(22) Filed: Oct. 18, 2004

(65) Prior Publication Data

US 2006/0082075 A1  Apr. 20, 2006

(51) Int. Cl.
*B23B 31/14* (2006.01)
(52) U.S. Cl. .................. 279/130; 279/125; 279/129; 157/16
(58) Field of Classification Search ........... 279/125, 279/129, 130, 131, 112, 113, 132; 157/16, 157/17, 18, 19, 20, 21
See application file for complete search history.

(56) References Cited

U.S. PATENT DOCUMENTS

| | | | |
|---|---|---|---|
| 1,959,081 A | 5/1934 | Le Jeune | |
| 2,194,936 A | 3/1940 | Hatch | |
| 2,207,621 A * | 7/1940 | Hite | 279/110 |
| 2,557,726 A | 6/1951 | Caswell | |
| 2,784,977 A * | 3/1957 | Dinsmore | 279/106 |
| 2,785,904 A * | 3/1957 | Garrison et al. | 279/106 |
| 2,982,558 A * | 5/1961 | Multer | 279/123 |
| 3,087,737 A * | 4/1963 | Werth | 279/4.05 |
| 3,131,946 A | 5/1964 | Newhouser | |
| 3,323,808 A | 6/1967 | Newhouser | |
| 3,938,815 A * | 2/1976 | F'Geppert | 279/130 |
| 4,034,786 A | 7/1977 | Feldmann et al. | |
| 5,464,233 A | 11/1995 | Hanai | |
| 5,562,007 A | 10/1996 | Seymour | |
| 5,820,137 A * | 10/1998 | Patterson | 279/141 |
| 6,017,266 A * | 1/2000 | Tabachenko | 279/130 |
| 6,126,174 A | 10/2000 | Reece et al. | |
| 6,425,584 B1 * | 7/2002 | Stickney | 279/119 |
| 6,481,281 B1 | 11/2002 | Gerdes | |
| 6,502,834 B1 | 1/2003 | Fukui et al. | |

FOREIGN PATENT DOCUMENTS

DE    2557882 A1 *  6/1977
JP    07-051908 A *  2/1995

* cited by examiner

*Primary Examiner*—Erica Cadugan
(74) *Attorney, Agent, or Firm*—MacMillan, Sobanski & Todd, LLC

(57) ABSTRACT

A wheel chuck includes a plurality of moveable jaws mounted upon a support structure. A plurality of moveable counterweights are mounted upon the support structure with each counterweight opposite from and connected to a corresponding one of the jaws. Upon rotation of the chuck the counterweights develop forces in opposition to centrifugal forces acting upon the jaws.

9 Claims, 7 Drawing Sheets

(Prior Art)

WHEEL CHUCK WITH COUNTERWEIGHTED JAWS

BACKGROUND OF THE INVENTION

This invention relates in general to fixtures for securing vehicle wheels upon machining stations during machining operations and in particular to a chuck with counterweights for securing a vehicle wheel upon a wheel lathe.

Light weight alloy vehicle wheels are becoming increasingly popular. Such wheels typically include an annular wheel rim that carries a tire. A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub.

One conventional process for manufacturing light weight alloy wheels involves pouring molten metal into a wheel mold to form a casting of a one-piece wheel. After the molten metal solidifies, the wheel casting is removed from the mold. The wheel casting is oversized and is machined to a final shape. Alternately, a full face wheel disc that includes the outboard tire bead retaining flange is cast from a light weight alloy and machined to final shape. A partial wheel rim that can be rolled from a strip of steel is then welded to an inboard surface of the wheel disc to form a two piece wheel. Such a wheel combines the low cost and strength of a steel rim with a pleasing aesthetic appearance of a wheel disc cast from a light weight metal and is usually referred to as a bimetal wheel.

Machining the wheel or wheel disc casting typically includes multiple operations. Sawing machines cut any casting gates and risers from the casting. A drilling machine is used to drill the wheel mounting holes through the wheel hub. The wheel casting is then mounted upon a wheel lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. The central pilot hole is usually drilled while the casting is clamped in the lathe for turning the inboard tire bead seat.

Referring now to the drawings, there is shown generally at 5 in FIGS. 1 and 2 a prior art wheel chuck. The known chuck 5 is suitable for clamping a wheel casting (not shown) or vehicle wheel 10 upon a wheel lathe (not shown). The chuck 10 includes a plurality of jaws 11. While three jaws 11 are shown in FIG. 1, the chuck 10 also may have four jaws. As best seen in FIG. 2, each jaw 11 includes a stepped portion 12 that includes a plurality of arcuate shaped clamping surfaces labeled 13, 13a and 13b, having different radii. The stepped portion 12 is carried upon the upper surface of a wedge shaped actuator plate 14 and is attached thereto by threaded fasteners 16. Alternately, the stepped portion 12 and the respective actuator plate 14 may be formed integrally as a one piece jaw (not shown). As best seen in FIG. 2, a guide rib 15 extends from the lower surface of each actuator plate 14 in a radial direction from the center of the chuck 10. As shown in FIG. 2A, the guide rib 15 is preferably formed having an inverted T cross sectional shape.

The actuator plates 14 are moveably mounted upon a support structure, indicated generally at 17. The support structure 17 includes a circular face plate 18 rotatably supported by bearings 20 upon a cylindrical riser 22. A plurality of radial slots 23 are formed in the upper surface of the face plate 18 with each of the slots having an inverted T cross sectional shape that mirrors the shape of the actuator plate guide ribs 15. Each radial slot 23 slidably receives a corresponding actuator plate guide rib 15 and cooperates with the rib to retain the actuator plate 14 upon the face plate 18 while guiding the actuator plate for movement in a radial direction. The face place 18 is drivingly coupled to a rotatable lathe spindle 24 that passes through a central aperture 26 formed through the riser 22.

Prior to mounting of the vehicle wheel 10a upon the chuck 10 for machining operations, at least one of the jaws 11 is moved in an outward radial direction, as generally indicated by the arrow labeled 28 in FIG. 1, to an open position. The movement is accomplished by urging the corresponding guide rib 15 outward within its respective face plate slot 23 by a conventional hydraulic ram or a mechanical mechanism (not shown). Typically, all of the jaws 11 are simultaneously moved outward. Once the jaws 11 are opened, the wheel 10a is placed upon an appropriate step, such as the step defined by the arcuate shaped clamping surface 13. The chuck 10 can accommodate wheels of different diameters, such as wheels 10a and 10b (shown in phantom in FIG. 2) that would be placed upon steps 13a and 13b, respectively. The jaws 11 are then moved in a radial inward direction to a closed position, as indicated by the arrow labeled 29, clamping the wheel 10a within the chuck 10.

During machining of the vehicle wheel 10, the lathe spindle 24 rotates the chuck 10 and the wheel 10, as indicated in FIG. 1 by an arrow labeled 30. The rotational motion generates centrifugal forces that urge the jaws 11 in a radial outward direction, as indicated by the arrow 28 in FIG. 1. If the centrifugal forces are sufficiently large, the jaws 11 will move in a radial outward direction and the chuck 10 will loosen upon the wheel 26 allowing the wheel to slip relative to the jaws 11. Thus, it would be desirable to provide a wheel chuck with jaws that would not be effected by centrifugal forces.

BRIEF SUMMARY OF THE INVENTION

This invention relates to counterweighted jaws for clamping a wheel upon a wheel lathe chuck.

The present invention contemplates a lathe chuck that includes a support structure adapted to be secured to a lathe spindle having a plurality of jaws mounted thereupon with at least one of the jaws being radially moveable. The jaws are adapted to releasably clamp a vehicle wheel in a position relative the support structure. The chuck also includes at least one moveable counterweight mounted upon the support structure opposite from and connected to the moveable jaw. The counterweight is operable to counteract centrifugal forces urging the jaw away from the center of the support structure when the support structure is rotated by the lathe spindle.

The invention further contemplates that the moveable jaw is connected to the counterweight by a bar that passes over the center of the support structure. In the preferred embodiment, the bar includes a slot that receives a guide pin that extends from the center of the support structure. The invention further contemplates a plurality of moveable jaws mounted upon the support structure with each jaw connected to a corresponding moveable counterweight by a connecting bar. The connecting bars are positioned in parallel non-intersecting planes that are also parallel to a surface of the support structure such that the connecting bars pass by one another without interference. Alternately, non-elastic wires may be utilized to connect the jaws to the counterweights.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
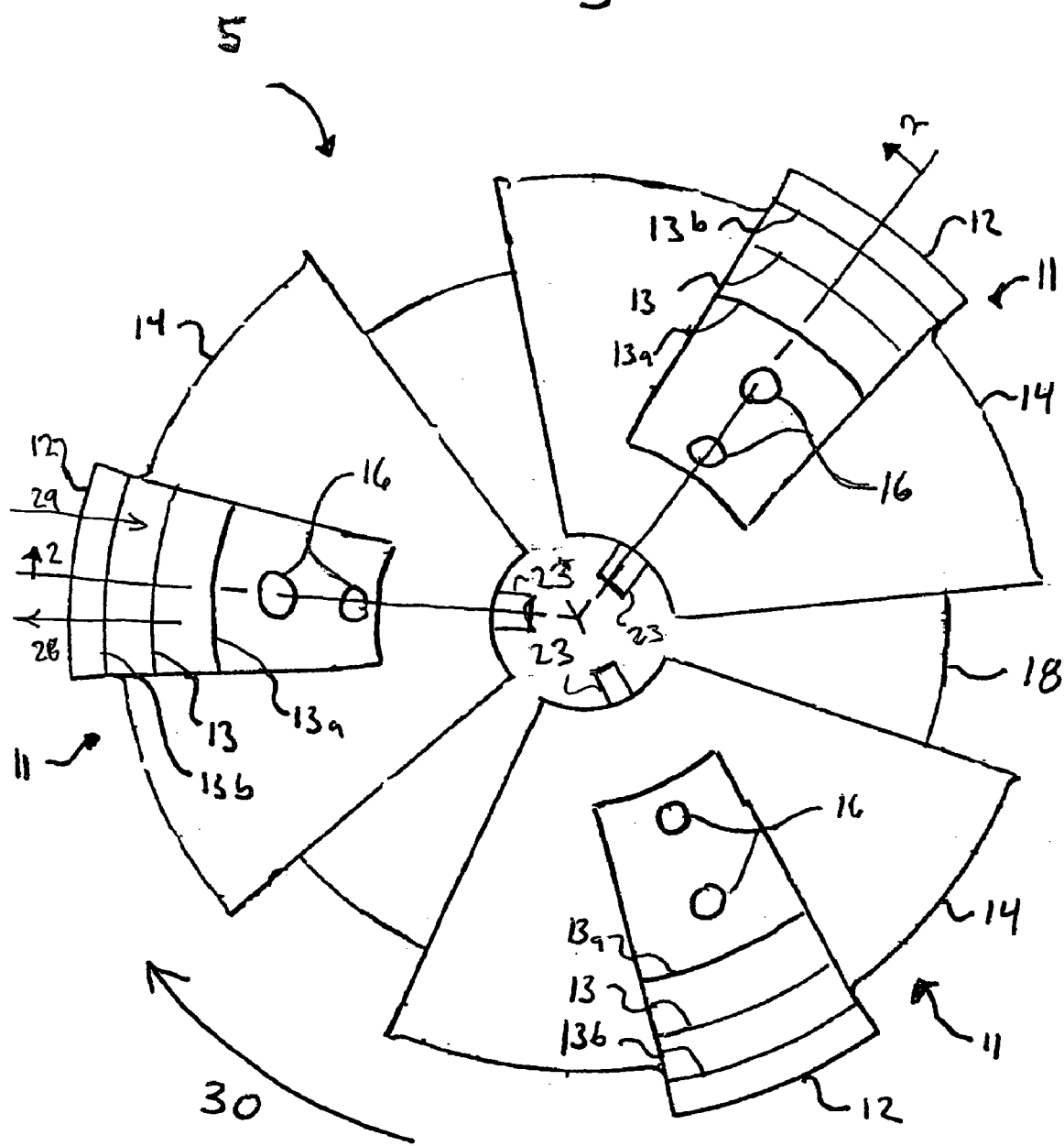
FIG. 1 is a front view of a know wheel chuck.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 2:
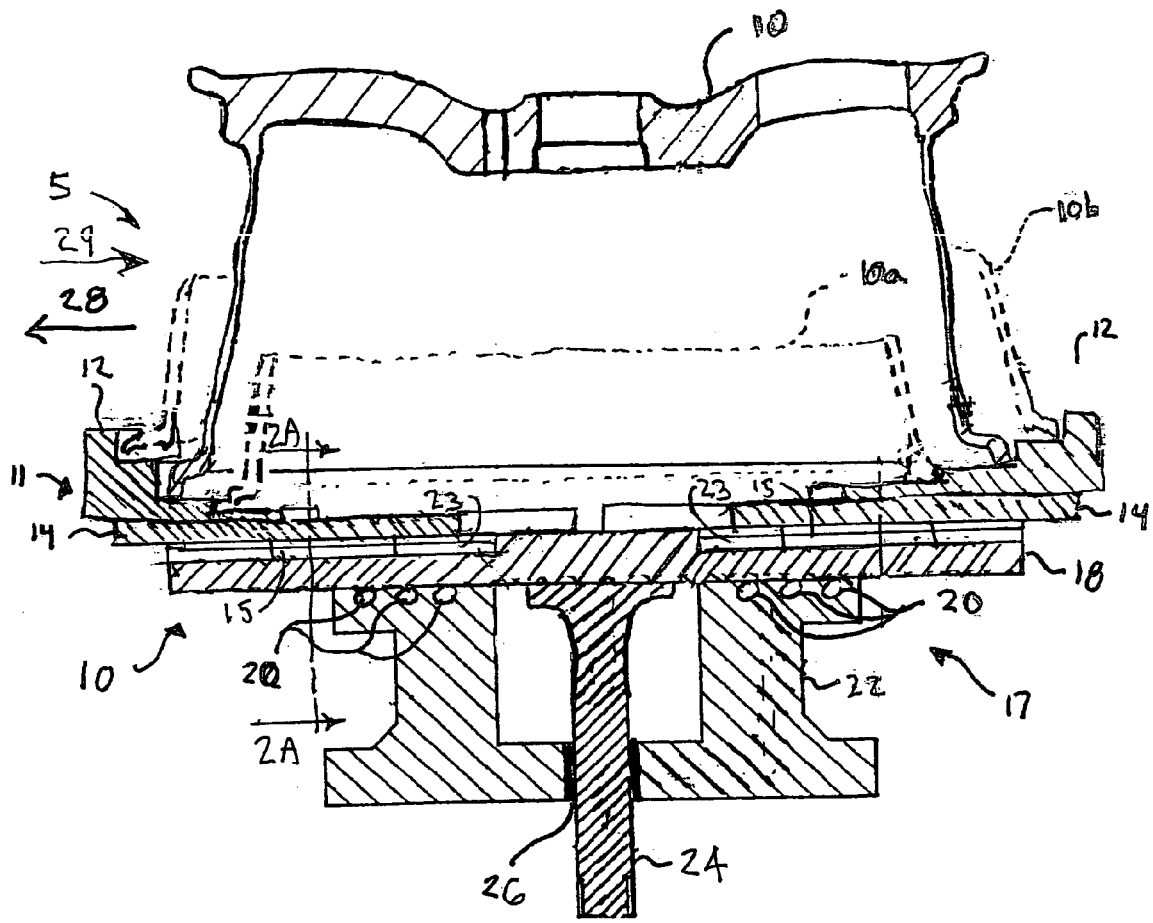
FIG. 2 is a sectional view of the wheel chuck taken along the line 2—2 in FIG. 1.
Figure 2A:
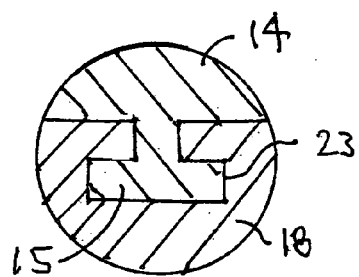
FIG. 2A is a fragmentary sectional view of the wheel chuck taken along the line 2A—2A in FIG. 2.
Figure 3:
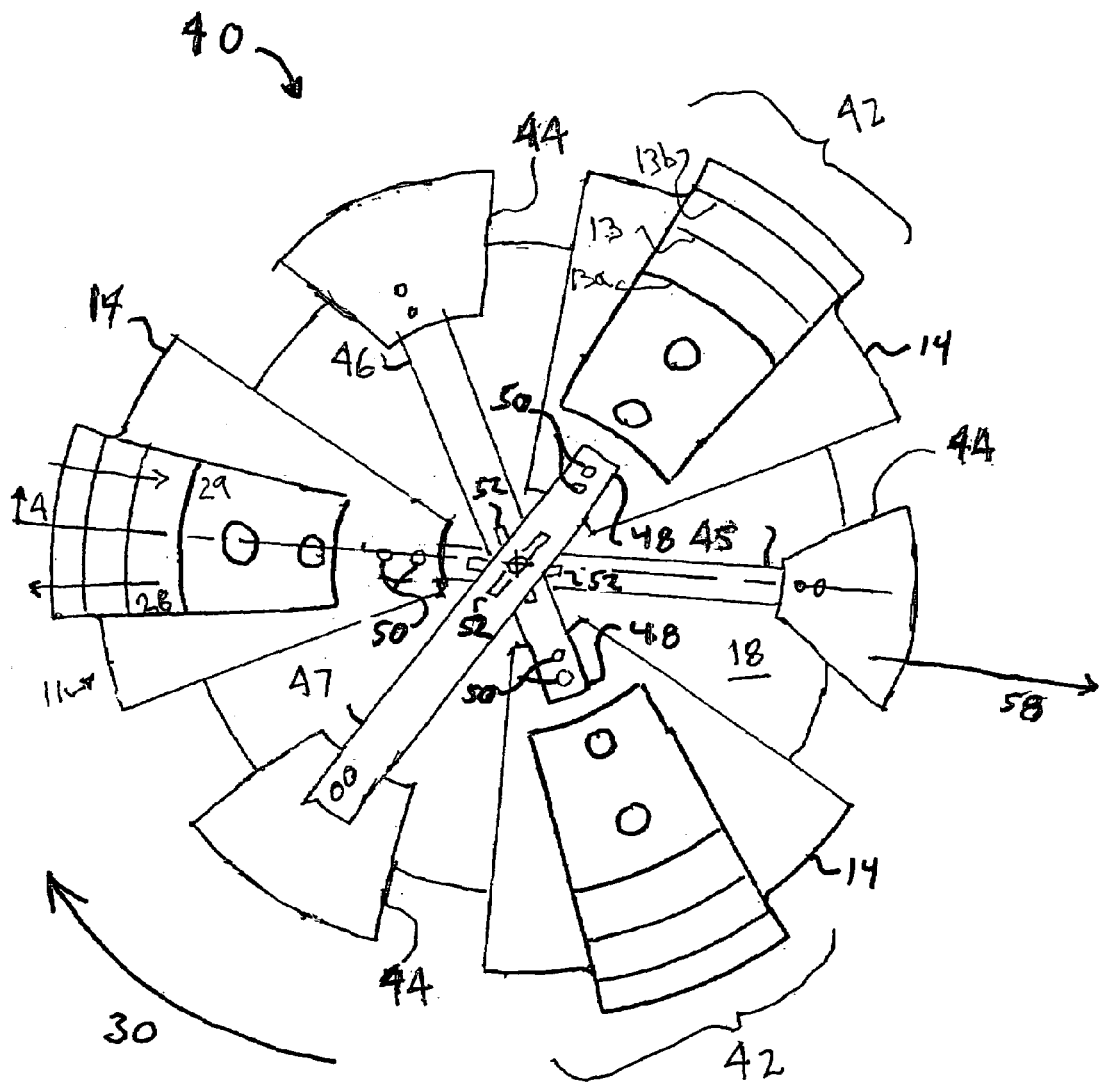
FIG. 3 is a front view of a wheel chuck in accordance with the present invention.
Figure 4:
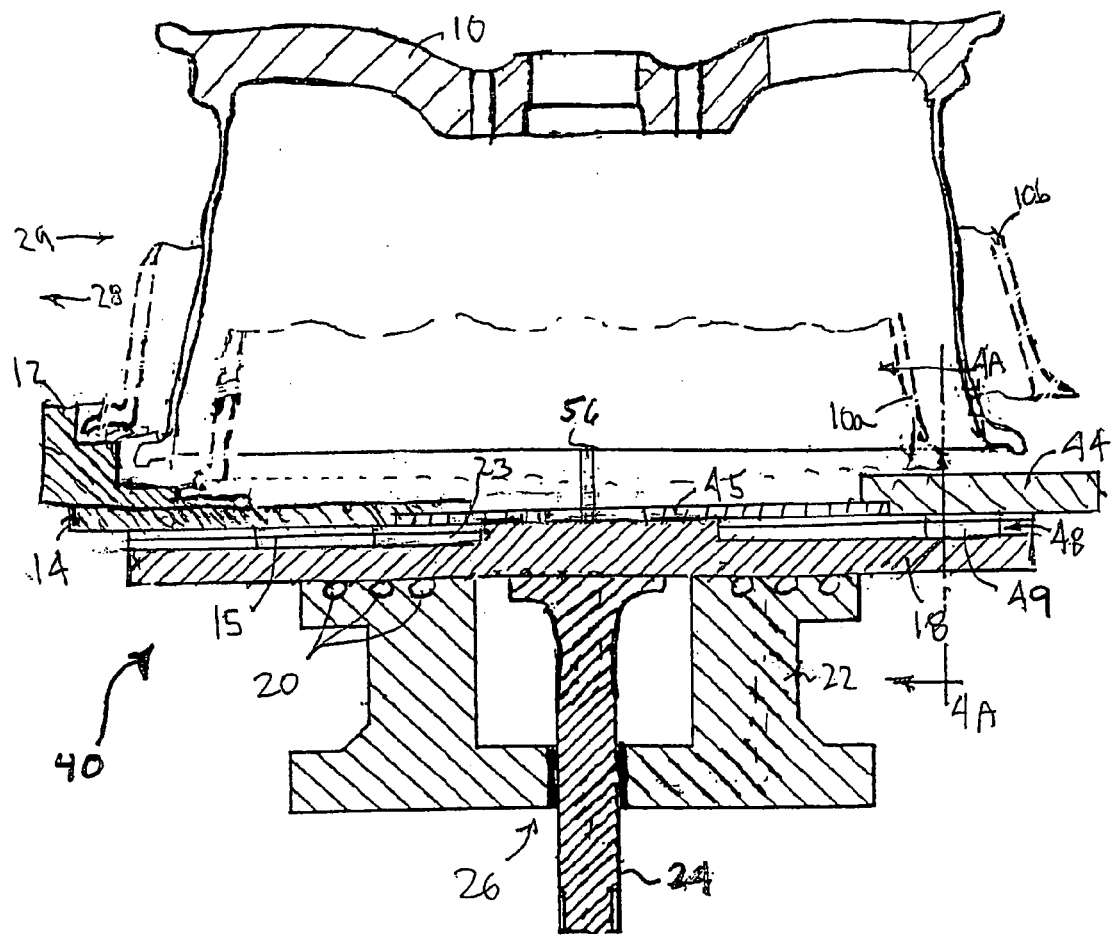
FIG. 4 is a sectional view of the wheel chuck taken along the line 4—4 in FIG. 3.
Figure 5:
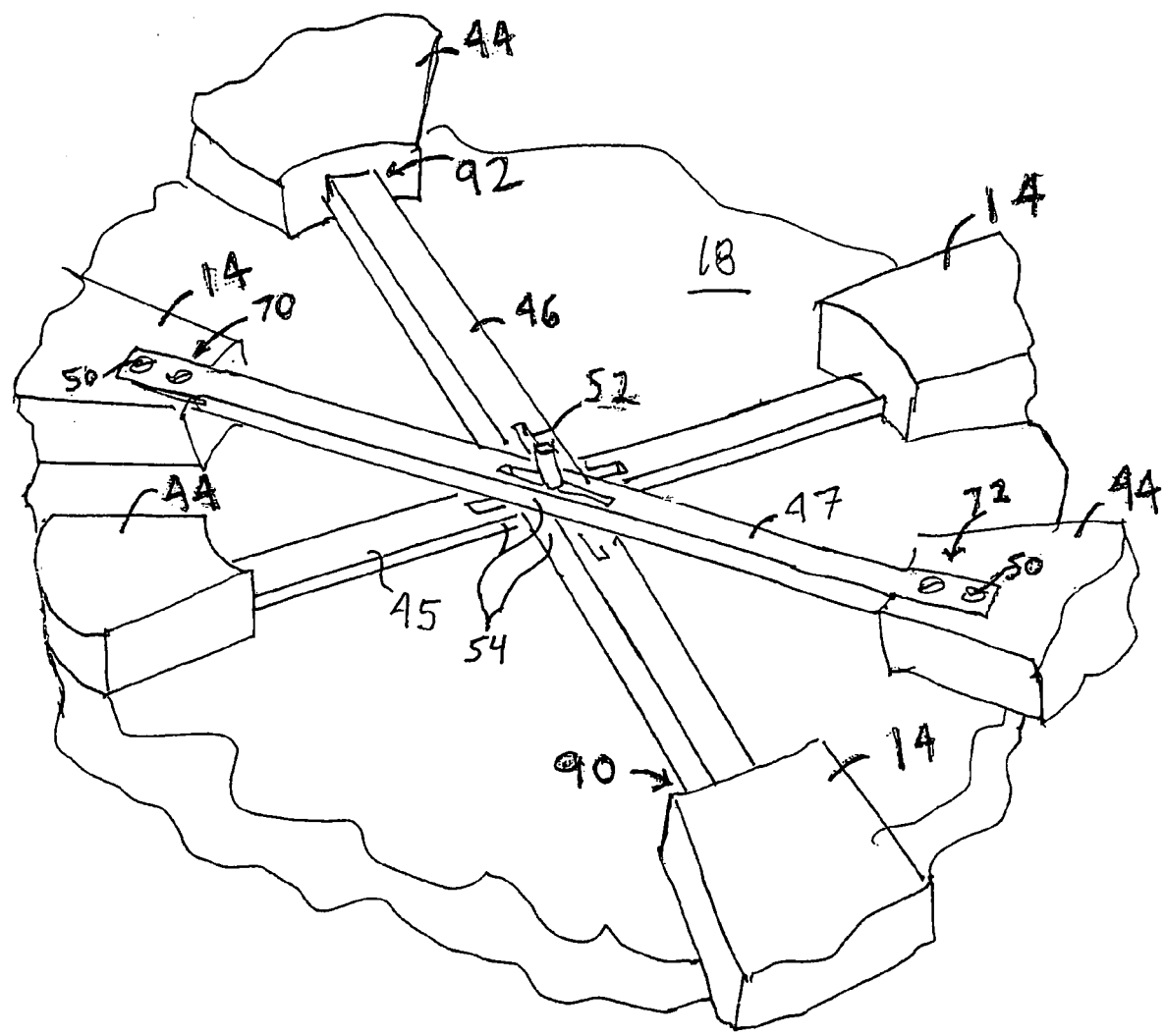
FIG. 5 is a perspective view of a portion of the wheel chuck shown in FIGS. 3.

Referring again to the drawings, there is illustrated, in FIGS. 3 through 5, an improved wheel chuck 40 that includes a plurality of counterweighted jaws 42 in accordance with the present invention. Components shown in FIGS. 3 through 5 that are similar to components shown in FIGS. 1 through 2A are labeled with the same numerical identifiers. Similar to the prior art wheel chuck 10 described above, each of the counterweighted jaws 42 includes a stepped portion 12 having arcuate shaped clamping surfaces mounted upon an actuator plate 14. The stepped portions 12 are sized to accept wheels having different diameters. A guide rib 15 extending from the lower surface of the each of the actuator plates 14 is sliding received by a corresponding radial slot 23 formed in the adjacent surface of a lathe face plate 18.

As best seen in FIG. 3, each of the counterweighted jaws 42 is attached to an oppositely positioned counterweight 44 by one of a plurality of rigid connecting bars 45, 46 or 47. Thus, for the illustrated chuck 40, there are three jaws 42 attached to three counterweights 44 by three connecting bars 45, 46 and 47. However, for clarity, only one assembly of counterweight 44, connecting bar 45 and actuator plate 14 is shown in FIG. 4. A first end of each connecting bar is attached to one of the jaw actuator plates 14 by threaded fasteners 50, such as screws or bolts, or by other conventional methods, such as riveting, welding or attaching with an adhesive. Similarly, a second end of each connecting bar is attached to the associated counterweight 44 by threaded fasteners 50, such as screws or bolts, or by other conventional methods, such as riveting, welding or attaching with an adhesive.

Figure 4A:
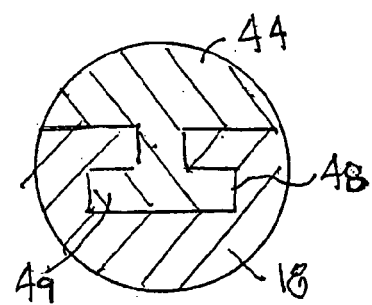
FIG. 4A is a fragmentary sectional view of the wheel chuck taken along the line 4A—4A in FIG. 4.

Similar to the jaws 42, each of the counterweights 44 has a guide rib 49 that extends from the lower surface thereof and in a radial direction from the center of the chuck 40. As shown in FIG. 4A, the counterweight guide rib 46 is preferably formed with an inverted T cross sectional shape; however, other cross sectional shapes also may be used for the guide rib 49. The counterweight guide rib 49 is slidingly received in a corresponding one of a plurality of radial counterweight guide slots 48 that are formed in the upper surface of the face plate 18. Each of the counterweight guide slots 48 has a shape that mirrors the shape of the counterweight guide ribs 49. Accordingly, as shown in FIG. 4A, each of the counterweight guide slots 48 has an inverted T cross sectional shape. Each radial counterweight slot 48 cooperates with one of the counterweight guide ribs 49 to retain the counterweight 44 upon the face plate 18 while also guiding the counterweight for movement in a radial direction. As shown in FIG. 4, the height of the counterweights 44 is selected such that the edge of a wheel clamped in the chuck 40 can extend over the counterweight, if necessary. Although the counterweights 44 are shown as generally wedge shaped, it must be understood that the counterweights also may be formed with any suitable shape.

As best shown in FIG. 5, in the preferred embodiment, each of the connecting bars 45, 46 and 47 includes a central slot 52 formed through an intermediate portion 54 of the bar. A common guide pin 56 that extends perpendicularly from the center of the face plate 18 is slidably disposed within each of the slots 52. As also illustrated in FIG. 5, each of the connecting bars is positioned in a non-intersecting plane that is parallel to the surface of the face plate 18. Thus, the connecting bars 45, 46 and 47 are stacked over the guide pin 56 with each bar positioned at a different distance from the face plate surface such that the bars may move relative to one another. However, it will be appreciated that the guide pin 56 and central slots 52 may be optional depending upon the rigidity of the connecting bars 45, 46 and 47 and the retention of the jaws 42 and counterweights 44 upon the face plate 18. Accordingly, the invention also may be practiced without slots 52 formed through the connecting bars and without the guide pin (not shown).

In the following discussion, a first connecting bar 45, that is closest to the surface of the face plate 18, is designated as a lower bar. A second connecting bar 46, that passes over the lower bar 45 is designated as a middle bar while a third connecting bar 47 that passes over both the lower and middle bars 45 and 46 is designated as an upper bar. As shown in the figures, the ends of the upper connecting bar 47 are received in radially extending slots 70 and 72 formed in the upper surfaces of the associated actuator plate and counterweight. Similarly, the ends of the lower connecting bar 45 are received in radially extending slots (not shown) formed in the lower surfaces of the associated actuator plate and counterweight. Finally, the ends of the middle connecting bar 46 are received in radially extending recesses 90 and 92 that extend into the middle portions of the associated actuator plate counterweight.

It must be understood, however, that the specific shape and configuration shown and described for the connecting bars 45, 46 and 47 is exemplary and is not intended to be limiting. Thus, the connecting bars also may be bent such that they generally lie against the surface of the face plate 18, but pass over one another at the center of the plate (not shown). When the connecting bars are adjacent to the face plate surface, the invention contemplates that the counterweight guide rib may optionally be replaced by a similar guide rib extending from the surface of the connecting bar that is adjacent to the face plate. Also, while the connecting bars 44 have been illustrated as generally flat bars having a rectangular cross sectional shape, it will be appreciated that the bars may have other cross sectional shapes than that shown, such as, for example, oval or square. Additionally, it also must be understood that, although the present embodiment has been described with three sets of actuator plates 14, connecting bars 45, 46 and 47 and counterweights 44, the present invention also contemplates a chuck having more or less sets of actuator plate 14, connecting bar and counterweight 44, such as, for example two or four sets.

The operation of the chuck 40 will now be explained. Referring again to FIGS. 3 and 4, prior to mounting of the vehicle wheel 10 upon the chuck 40 for machining operations, the counterweighted jaws 42 are moved in an outward radial direction, as generally indicated by the arrow labeled 28 in FIG. 3, to an open position. The movement is accomplished by urging the corresponding actuator plate guide rib 15 outward within its respective face plate slot 23 by a conventional hydraulic ram or a mechanical mechanism (not shown). As the jaws 42 are opened, the connecting rods 45, 46 and 47 pull the associated counterweights in an inward radial direction across the face plate 18. The movement of the counterweights 44 is guided by interaction of the counterweight guide ribs 49 with the counterweight guide slots 48. Once the jaws 11 are opened, the wheel 10 is placed upon an appropriate step, such as the step defined by the arcuate shaped clamping surface 13. The chuck 40 can accommodate wheels of different diameters, such as wheels 10a and 10b (again shown in phantom in FIG. 4) that would be placed upon steps defined by the arcuate shaped surfaces 13a and 13b, respectively. The jaws 11 are then moved in a radial inward direction to a closed position, as indicated by the arrow labeled 29, clamping the wheel 10 within the chuck 40. As the jaws 42 are closed, the connecting rods 45, 46 and 47 push the associated counterweights 44 in an outward radial direction across the face plate 18.

During machining of the vehicle wheel 10, the spindle 20 rotates the chuck 40, and in turn the wheel 10, as indicated by an arrow labeled 30 in FIG. 3. Because of the rotational motion, centrifugal forces tend to act upon the jaws 42, urging the jaws in an outward radial direction, as indicated by the arrow labeled 28 in FIG. 3. Because of the rotational motion, centrifugal forces also tend to act on the counterweights 44, urging the counterweight in an outward radial direction, as indicated by the arrow labeled 58 in FIG. 3. Thus, the centrifugal forces acting upon the counterweights 42 are transferred through the connecting bars 45, 46 and 47 to oppose the centrifugal forces acting upon the jaws 42. The centrifugal forces acting upon the counterweights 44 are proportional to the masses of the counterweights 44 and the lengths of the connecting bars 45, 46 and 47. Thus, a desired effect can be achieved by varying the mass of the counterweights 44 and the length of the connecting bars 45, 46 and 47. Each counterweight 44 generates a centrifugal force that is in opposition to the centrifugal force generated by the corresponding combination of jaw stepped portion 12 and actuator plate 14. By carefully selection of the mass of the counterweights 44 and the lengths of the connecting bars 45, 46 and 47, the generated counterweight centrifugal forces will tend to increase the locking pressure of the chuck jaws 42 upon the wheel 10. Accordingly, the chuck jaws 42 will hold the wheel 10 tighter as the angular momentum is increased, as compared to the loosening effect encountered with a prior art chuck 10 that does not include counterweighted jaws.

Figure 6:
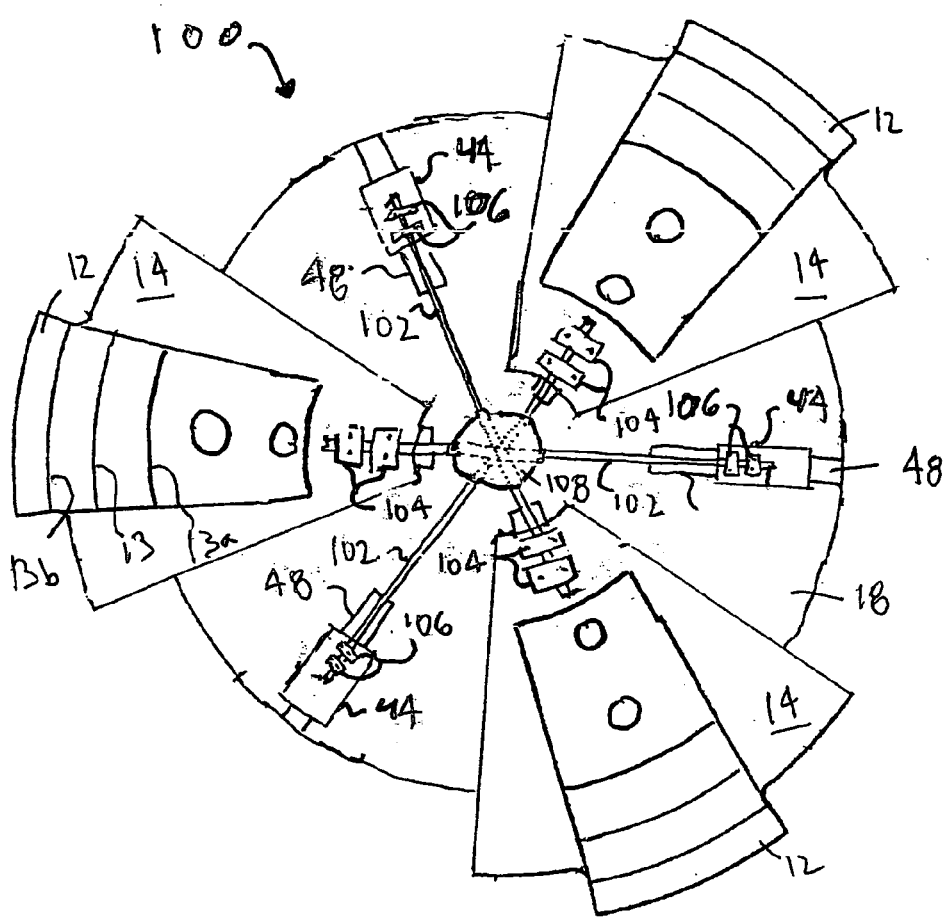
FIG. 6 is a front view of an alternate embodiment of the wheel chuck shown in FIG. 3.

Referring to FIG. 6, there is illustrated a wheel chuck 100 in accordance with an alternative embodiment of the present invention, where similar components shown in FIGS. 1 through 5, are labeled with the same numeric identifiers. Similar to the chuck 40 described above, the alternate embodiment chuck 100 includes a plurality of counterweighted jaws 42 carried upon a lathe face plate 18. The jaws 42 are retained and guided by guide ribs 15 that are slidably received in radial guide slots 23 formed in the surface of the face plate 18. Each of the jaws 42 is connected by a rigid connecting rod 102, or an inelastic connecting wire, to an associated counterweight 44 that is positioned upon the face plate 18 opposite from the jaw 42. The counterweights are again retained and guided by guide ribs 49 that are slidably received in radial guide slots 48 formed in the surface of the face plate 18. In the preferred embodiment, each of the jaws 42 includes an actuator plate 14 that is secured to one end of the connecting rod 102 by a pair of clamps 104. However, it will be appreciated that the actuator plate 14 also may be secured to its respective connecting rod 102 in any suitable manner, such as by welding or with adhesive or fasteners, such as bolts, screws or rivets. Similarly, in the preferred embodiment, each of the counterweights 44 is secured to the other end of the connecting rod 102 by a pair of clamps 106. However, it will again be appreciated that the counterweights 44 also may be secured to their respective connecting rod ends in any suitable manner, such as by welding or with adhesive or fasteners, such as bolts, screws or rivets. Preferably, the counterweights 44 all have the same mass.

As before, the invention contemplates that each of the connecting rods 102, or inelastic wire, is positioned in a non-intersecting plane that is parallel to the surface of the face plate 18. Thus, the connecting rods 102 are positioned at different distances, or heights, from the surface of the face plate 18 and stacked over one another at the center of the face plate 18 such that the rods 102 may move relative to one another. Accordingly, the heights of the corresponding jaws 42 and counterweights 44 may be adjusted to accommodate the different rod distances from the face plate 18. Alternately, the method of securing the rod ends to the jaws 42 and counterweights 44 may be selected to accommodate the different rod distances, or heights from the face plate. For example, the holes may be drilled into the counterweights 44 at differing heights to receive the rod ends. The connecting rod ends may then be secured within the holes. The same approach also may be applied to the actuator plates 12.

Figure 7:
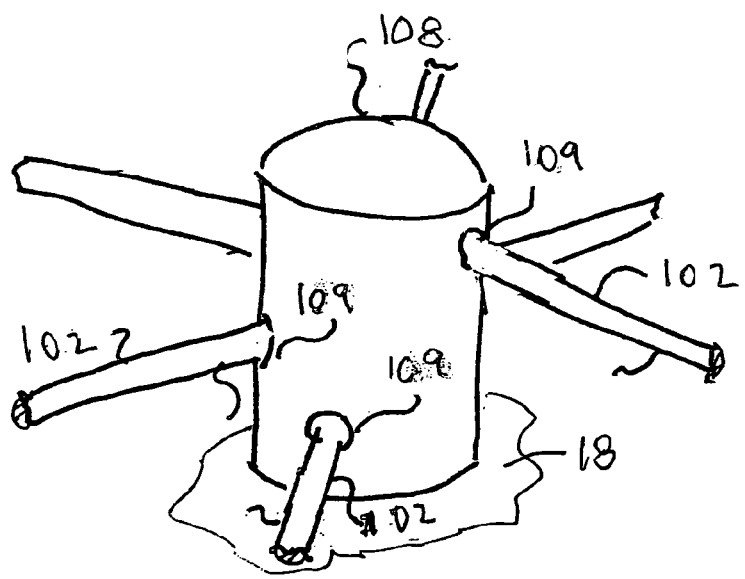
FIG. 7 is a perspective view of a portion of the wheel chuck shown in FIG. 6.

As best shown by a portion of the chuck 100 in FIG. 7, the chuck 100 also includes a rod guide column 108 that extends perpendicularly from the center of the face plate 18. The rod guide column 108 includes a plurality of rod guide passageways 109 that extend transversely through the column at different heights above the face plate 18. The connecting rods 102 are slidably disposed within the rod guide passageways 109 with their midsections passing over one another.

However, it will be appreciated that the rod guide column 108 may be optional depending upon the rigidity of the connecting rods 102 and the retention of the jaws 42 and counterweights 44 upon the face plate 18.

Figure 8:
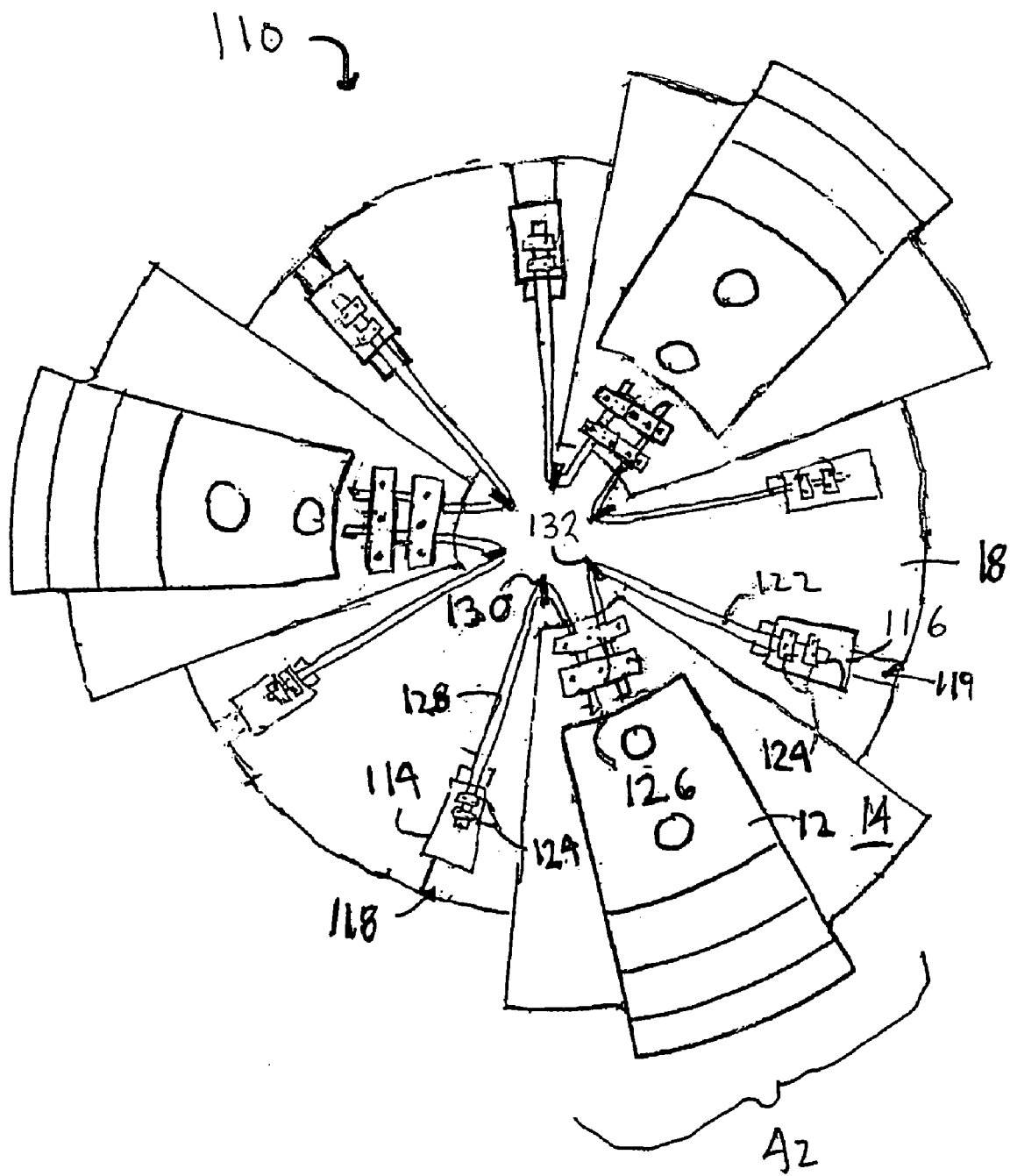
FIG. 8 is a front view of another alternate embodiment of the wheel chuck shown in FIG. 3.

Referring to FIG. 8, there is illustrated a wheel chuck 110 in accordance with another alternative embodiment of the present invention, where similar components shown in FIGS. 1 through 7, are labeled with the same numbers. The chuck 110 again includes a plurality of jaws 112 with each jaw associated with a pair of counterweights 114 and 116. In the preferred embodiment, each pair of counterweights 114 and 116 is again retained upon the face plate 18 by a guide rib (not shown) that is slidably received by a radial guide slot 118 and 119, respectively. Each of the counterweights 114 and 116 is attached to a first end of a flexible inelastic connecting wire, or cord, 120 and 122, respectively, by a pair of wire clamps 124. It must be understood, however, that the counterweights 114 and 116 also may be secured to the first end of their respective connecting wires 120 and 122 in any suitable manner, such as welding, adhesive, threaded fasteners, such as bolts or screws, or rivets. A second end of each pair of connecting wires 120 and 122 is attached to a corresponding actuator plate 14. Again, in the preferred embodiment, the second end of each connecting wire 120 and 122 is secured to its respective actuator plate 14 by a pair of wire clamps 126. However, the second end of each connecting wire 72 also may be secured to its respective actuator plate 14 by any suitable fastener, such as rivets, screws or bolts, or in any suitable manner, such as by welding or by adhesive. For clarity, only one set of counterweights and connecting wires have been labeled in FIG. 8, the other sets have the same structure as described above.

Each connecting wire 120 and 122 slidably passes through a respective wire guide 130 and 132 secured to the face plate 18. The wire guides 130 and 132 allow placement of the counterweights 114 and 116 on either side of the actuator plate 14, thus eliminating the crossing of connectors in the middle of the face plate 18. In the preferred embodiment, eye bolts are used for the wire guides 130 and 132, with the connecting wire passing through the eye. Other devices also may be used for the wire guide, such as, for example, a pulley (not shown) having its groove mounted parallel to the surface of the face plate 18. The rotation of the pulley reduces frictional drag upon the connecting wire.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A chuck assembly comprising:
   a support structure adapted to be secured to a lathe spindle;
   a plurality of jaws mounted upon said support structure with at least one of said jaws being radially moveable, said jaws adapted to releasably clamp a vehicle wheel in a position relative to said support structure;
   a plurality of moveable counterweights mounted upon said support structure opposite, each of said moveable counterweights mounted opposite from said moveable jaws, each of said moveable counterweights mounted opposite from said associated jaw and connected thereto by one of a plurality of connecting bars positioned in non-interesting parallel planes spaced apart from said support structure such that said connecting bars pass by one another, each of said connecting bars including a slot, each counterweight being operable to counteract centrifugal forces urging each associated jaw away from the center of said support structure upon rotation of said support structure; and
   a guide pin mounted upon said support structure, said guide pin extending through said slot.

2. The chuck assembly of claim 1 wherein said guide pin is mounted in the center of said support structure.

3. A chuck assembly comprising:
   a support structure adapted to be secured to a lathe spindle;
   a plurality of jaws mounted upon said support structure with at least one of said jaws being radially moveable, said jaws adapted to releasably clamp a vehicle wheel in a position relative to said support structure; and
   at least one moveable counterweight mounted upon said support structure opposite from said moveable jaw and connected to said moveable jaw by a connecting wire, said counterweight being operable to counteract centrifugal forces urging said jaw away from the center of said support structure upon rotation of said support structure.

4. The chuck assembly of claim 3 including a plurality of moveable jaws and a plurality of moveable counterweights mounted upon said support structure with each of a said moveable jaws associated with one of said moveable counterweights mounted opposite from a corresponding one of said jaws and connected thereto by one of a plurality of connecting wires, each of said connecting wires being positioned in a non-intersecting parallel plane spaced apart from said support structure such that said connecting wires pass by one another.

5. The chuck assembly of claim 4 wherein said chuck assembly includes a wire guide column mounted in the center of said support structure, said wire guide column including a wire guide passageways, said connecting wires being disposed within said wire guide passageways.

6. The chuck assembly of claim 5 wherein said connecting wires are inelastic.

7. A chuck assembly comprising:
   a support structure adapted to be secured to a lathe spindle;
   a plurality of jaws mounted upon said support structure with at least one of said jaws being radially moveable, said jaws adapted to releasably clamp a vehicle wheel in a position relative to said support structure; and
   a pair of counterweights associated with said moveable jaw, said pair of counterweights mounted upon said support structure adjacent to opposite sides of said moveable jaw and connected thereto by a pair of flexible, inelastic wires, said counterweights being operable to oppose radial movement of said moveable jaw upon rotation of said support structure.

8. The chuck assembly of claim 7 further including a pair of wire guides mounted upon said support structure, each of said wire guides slidably receiving one of said connecting wires and operative to guide said wire.

9. The chuck assembly of claim 8 wherein said support structure includes a wheel lathe face plate having at least one radial guide slot formed therein and further wherein at least one of said counterweights has a guide rib extending therefrom, said counterweight guide rib being slidably received and retained in said guide slot formed in said face plate.

* * * * *

UNITED STATES PATENT AND TRADEMARK OFFICE
CERTIFICATE OF CORRECTION

PATENT NO. : 7,198,277 B2
APPLICATION NO. : 10/967729
DATED : April 3, 2007
INVENTOR(S) : Geoffrey L. Gatton It is certified that error appears in the above-identified patent and that said Letters Patent is hereby corrected as shown below:

Column 7, Claim 1, Line 61, delete "mounted opposite from" and insert --being associated with one of--;
Line 65, delete "non-interesting" and insert --non-intersecting--.
Column 8, Claim 4, Line 25, after "of" delete "a".
Column 8, Claim 5, Line 36, after "including" delete "a".

Signed and Sealed this

Twenty-second Day of May, 2007

JON W. DUDAS
*Director of the United States Patent and Trademark Office*